US010035205B2

(12) United States Patent
Brandsberg et al.

(10) Patent No.: US 10,035,205 B2
(45) Date of Patent: Jul. 31, 2018

(54) MACHINE FOR HONING GEARS

(71) Applicant: MDC MAX DAETWYLER AG, Bleienbach (CH)

(72) Inventors: Frederik Brandsberg, Zurich (CH); Urs Bernhardsgruetter, Russikon (CH)

(73) Assignee: MDC MAX DAETWYLER AG, Bleienbach (CH)

( * ) Notice: Subject to any disclaimer, the term of this patent is extended or adjusted under 35 U.S.C. 154(b) by 176 days.

(21) Appl. No.: 14/911,581

(22) PCT Filed: Nov. 20, 2013

(86) PCT No.: PCT/CH2013/000202
§ 371 (c)(1),
(2) Date: Feb. 11, 2016

(87) PCT Pub. No.: WO2015/021566
PCT Pub. Date: Feb. 19, 2015

(65) Prior Publication Data
US 2016/0199927 A1 Jul. 14, 2016

(30) Foreign Application Priority Data

Aug. 12, 2013 (CH) ........................................ 1379/13

(51) Int. Cl.
*B23F 19/05* (2006.01)
*B23F 23/12* (2006.01)

(52) U.S. Cl.
CPC ........ *B23F 19/057* (2013.01); *B23F 23/1231* (2013.01)

(58) Field of Classification Search
CPC ........ B23F 19/05; B23F 19/057; B23F 23/12; B23F 23/1231

(Continued)

(56) References Cited

U.S. PATENT DOCUMENTS 5,347,760 A * 9/1994 Miyauch ............... B23F 19/057
451/114
5,591,065 A * 1/1997 Mizuno ................. B24B 53/075
451/180

(Continued)

FOREIGN PATENT DOCUMENTS

DE 2719524 A1 12/1977
DE 9300936.4 U1 5/1993

(Continued)

*Primary Examiner* — Robert Rose
(74) *Attorney, Agent, or Firm* — Birch, Stewart, Kolasch & Birch, LLP

(57) ABSTRACT

A machine for honing gears comprises a workpiece spindle, the spindle axis of which is oriented vertically, wherein a workpiece to be machined is attachable in the region of a free end of the workpiece spindle, a honing ring carrier in which a honing ring for machining the workpiece attached to the workpiece spindle is clampable and is drivable in rotation about its central axis, and a machine frame on which the workpiece spindle and the honing ring carrier are mounted. The machine frame surrounds the honing ring carrier. The honing ring carrier is additionally mounted at two bearing points on the machine frame, said bearing points being substantially diametrically opposite one another with regard to the honing ring carrier, so as to be movable linearly along a horizontal axis which extends through the bearing points and so as to be movable in rotation about this axis. The machine has a simple and compact structure. The machine frame serves not only as a structural element for mounting the individual components of the machine and all required shafts, but at least partially also to form a working space in which the machining takes place.

18 Claims, 3 Drawing Sheets

(58) Field of Classification Search
USPC .............................................. 451/47, 72, 56
See application file for complete search history.

(56) References Cited

U.S. PATENT DOCUMENTS

| | | | | |
|---|---|---|---|---|
| 6,497,610 | B1* | 12/2002 | Reichert | ............ B23F 23/1231 |
| | | | | 451/21 |
| 6,958,000 | B2* | 10/2005 | Yoshioka | ............ B23F 23/1281 |
| | | | | 409/55 |
| 2006/0264155 | A1* | 11/2006 | Kobialka | .............. B23F 19/057 |
| | | | | 451/8 |

FOREIGN PATENT DOCUMENTS

| | | |
|---|---|---|
| DE | 43 29 822 C2 | 9/1996 |
| DE | 10 2005 005 993 A1 | 8/2006 |
| DE | 20 2011 051 332 U1 | 11/2011 |
| DE | 102010024366 A1 | 12/2011 |
| EP | 1319458 B1 | 11/2010 |
| JP | 6-143031 A | 5/1994 |
| JP | 6-190631 A | 7/1994 |
| JP | 7-237036 A | 9/1995 |

* cited by examiner

MACHINE FOR HONING GEARS

TECHNICAL FIELD

The invention relates to a machine for honing gears, comprising a workpiece spindle, the spindle axis of which is oriented vertically, wherein a workpiece to be machined is attachable in the region of a free end of the workpiece spindle, a honing ring carrier in which a honing ring for machining the workpiece attached to the workpiece spindle is clampable and is drivable in rotation about its central axis, and a machine frame on which the workpiece spindle and the honing ring carrier are mounted.

PRIOR ART

Machines of this type for honing gears are known. In the production of externally toothed gears, following basic profiling of the workpiece, a honing ring rolls on the workpiece to be machined with mutually offset axes therewith. Such honing machines are used inter alia for the mass production of gears for drive components of vehicles, for example passenger cars and trucks. Compared with ground gears, honed gears are distinguished by their advantageous noise characteristics and low wear. During honing, low cutting speeds are employed, with the result that the thermal load on the workpiece can be kept low.

DE 43 29 822 C2 (Honda) shows a gear fine-machining apparatus having a frame with a horizontally extending guide part, a grinding wheel carrier unit having a grinding wheel head which carries an annular grinding wheel in the form of an internal gear, wherein the carrier unit is fixable and rotatable about a horizontal axis. The grinding wheel carrier unit is additionally displaceable along the horizontally extending guide part in the direction of the axis of rotation of the grinding wheel head by means of a drive. The apparatus furthermore comprises a workpiece carrier unit having a spindle for holding an externally toothed gear workpiece, wherein this carrier unit is guided so as to be displaceable in the direction of the axis of the workpiece W. The frame is for example a rectangular parallelepiped, wherein the workpiece carrier unit is attached to a side face thereof. It furthermore has a vertically extending guide part for the displacement of the workpiece carrier unit.

The known machines usually have a complex structure. They are accordingly expensive and require a large setting volume.

SUMMARY OF THE INVENTION

The problem addressed by the invention is that of creating a machine for honing gears, belonging to the technical field mentioned at the beginning, which has a simple and space-saving structure.

The solution to the problem is defined by the features of claim 1. According to the invention, the machine frame surrounds the honing ring carrier, and the honing ring carrier is mounted at two bearing points on the machine frame, said bearing points being substantially diametrically opposite one another with regard to the honing ring carrier, so as to be movable linearly along a horizontal axis which extends through the bearing points and so as to be movable in rotation about this axis.

The solution according to the invention allows a simple and compact structure of the honing machine. In contrast for example to DE 43 29 822 C2, the mounting of the honing ring carrier can be executed with smaller dimensions on account of the support on both sides. The arrangement according to the invention of the honing ring carrier makes it easy to close off the working space, in particular with respect to the escape of lubricants and chips. The machine frame serves not only as a structural element for mounting the individual components of the machine and all required shafts, but at least partially also to form a working space in which the machining takes place.

In order to hone internal toothings, the workpiece to be machined can also be clamped in the honing ring carrier and in turn the (externally profiled) honing tool (abrasive gear) can be clamped on the workpiece spindle.

Preferably, the free end of the workpiece spindle is directed upward and the workpiece spindle is surrounded by the machine frame. In this way, the spindle is also received within the machine frame and surrounded thereby. Complex structures for spindle mounting that take up space are unnecessary. Furthermore, the workpieces can easily be changed from above, for example in that they are removed from the workpiece spindle through the honing ring carrier or are clamped on said workpiece spindle.

On account of the arrangement according to the invention of the shafts, these only have to execute small strokes. Accordingly, inexpensive, reliable and compact components can be used.

Advantageously, a drive for the workpiece spindle is arranged beneath the free end of the workpiece spindle, for example at the bottom end of the workpiece spindle. This results in a simple and stable structure. The drive used is for example a direct drive. Alternatively, the drive is arranged laterally with respect to the workpiece spindle and transmission to the spindle takes place for example via a gear drive or belt drive.

In alternative embodiments, the spindle can be arranged at the top such that the free end of the workpiece spindle is directed downward. The spindle can be arranged on a carrier which is mounted laterally on the machine frame surrounding the honing ring carrier or on an additional element. The drive is then arranged for example at the top end of the workpiece spindle.

Preferably, the machine frame forms a substantially closed enclosure which encloses a working space. In particular, the enclosure is configured such that the escape of lubricants or chips is reliably prevented. At the same time it prevents contact with persons, which could result in injury. As a result, the further shielding surrounding the honing ring carrier is largely unnecessary. The machine frame is closed off for example downwardly and at the casing and has an opening to the working space only at the top. Through this opening, not only the honing ring carrier is accessible, for example in order to change the workpieces to be machined and the honing ring, but also the workpiece spindle. The machine frame can furthermore have further openings, in particular for maintenance purposes.

In particular, the machine frame is configured such that the working space is closable at the top by way of a flat cover for operation of the machine. By simply applying or inserting the cover, the working space is closed off fully. Since the cover has no static function, it can be formed in a lightweight and cost-effective manner. Preferably, a receptacle into which the cover can be placed or introduced with a proper fit can be formed on the machine frame.

Alternatively, closure elements having a different, for example domed, geometry can also be used, or the machine frame comprises movable elements which allow access to the honing ring carrier.

Preferably, the machine frame is configured in a straight cylindrical, in particular circular cylindrical manner. The shape of a straight circular cylinder allows a compact and at the same time stable geometry. Other shapes of the base of the straight cylinder, for example squares, rectangles, polygons with a larger number of corners or ellipses, are likewise possible.

Preferably, the bearing points comprise plain bearings or hydrostatic bearings. As a result, the machine according to the invention can be realized in a cost-effective and low-maintenance manner. The plain bearings additionally have high rigidity and high damping. Advantageously, the plain bearings are formed by plain bushings which are inserted into corresponding openings in the machine frame and are provided with seals against soiling. For example correspondingly dimensioned supporting elements, for example steel tubes, which extend on both sides of the honing ring carrier in the horizontal axis, and thus at the same time support the honing ring and also guide it along its linear movement axis, can interact with the plain bushings. Preferably, the plain bearings allow both this horizontal movement and the rotational movement of the honing ring carrier about the horizontal axis, i.e. serve as radial bearings with two degrees of freedom, a linear degree of freedom and a rotational degree of freedom.

The supporting elements are particularly preferably attached to the honing ring carrier such that their prolongation extends through the central point of the honing ring carrier. This allows a particularly simple and stable construction.

Alternatively, rather than plain bearings, use is made for example of rolling bearings. The carriers can also be configured as per the geometry set out above when rolling bearings are used. The rotational movability can be realized independently of the bearing points on the machining frame, for example in that the carriers have rotationally fixed portions and portions that are rotatable relative thereto about the longitudinal axis of the carriers.

A further possibility is the use of ball bushings. Thus–as in the case of plane bearings–both directions of movement can be made available by the same bearing unit.

In a preferred embodiment, the machine comprises a carrier on which a first drive for moving the honing ring carrier linearly along the horizontal axis extending through the bearing points and a second drive for moving the honing ring carrier in rotation about this axis are arranged. The carrier is arranged outside the machine frame and is displaceable along the horizontal axis together with the honing ring carrier. The corresponding supporting element for the honing ring carrier is advantageously rotatable as one with the carrier in the axial direction, but is rotatable about its longitudinal axis through a particular angular range with respect to the carrier.

The drives arranged outside the machine frame are protected against influences from the machining operation and do not interfere with the workpiece spindle or the honing ring carrier. The conjointly running arrangement of the drives results in simple force transmission to the shafts to be actuated. Since the travel of the carrier and thus also of the concurrently moved drives (e.g. servomotors) is small, the energy supply and control thereof can take place easily by way of normal flexible lines.

Advantageously, the first drive is coupled to a ball screw, wherein the ball screw is supported on the machine frame. This results in an easy and reliable linear adjustment possibility for the supporting elements of the honing ring carrier. The first drive is connected to the ball screw for example via a transmission, and said ball screw can extend through a corresponding opening into the interior of the machine frame. The transmission can be for example a planetary transmission or a harmonic drive transmission.

Alternatively, a different type of transmission, for example directly, via a toothed belt, a different type of spindle or a rack takes place. Finally, it is also possible to use a linear motor.

Preferably, a guide element is furthermore fixedly arranged on the carrier, wherein the guide element interacts with a further bearing point on the machine frame. This guide element represents an antirotation device for the carrier, such that the second drive can be supported easily on the carrier for the rotational movement of the supporting element.

Advantageously, the machine frame is produced substantially from cast stone. Such a frame is producible in a cost-effective manner and forms a stable base for the machine according to the invention.

In further preferred embodiments, the machine frame is produced substantially from steel. This choice of material allows a particularly compact embodiment of the machine. Steel tubes that are suitable for the casing of the machine frame are additionally obtainable at comparatively low costs on the market.

The machine frame can also be produced for example from granite or a combination of the materials mentioned.

Preferably, the workpiece spindle can execute a vertical stroke. Without the honing ring clamped in the honing ring carrier having to be moved in a vertical direction, the reciprocating movement, required in the honing process, between the honing ring and workpiece can be brought about in this way. The corresponding amplitude is small, as a rule at most a few mm. The workpiece spindle itself can provide the vertical stroke, or the workpiece spindle is arranged on a carriage which can be raised or lowered on a linear guide.

Advantageously, the workpiece spindle is adjustable in the vertical direction and fixable a desired vertical position. In contrast to the abovementioned reciprocating stroke, which is a dynamic shaft with a very small stroke, the workpiece spindle can be set differently for different machining operations and workpiece geometries. The corresponding stroke can be for example a few cm. The reciprocating and adjustment shafts can be provided by the same mechanism or different mechanisms. The two shafts can be realized for example by a slide that is movable along a linear axis and on which the workpiece spindle is arranged. The slide is positioned via a drive, which can be arranged for example in a stationary manner on the machine frame and can act on the slide via a ball screw. Alternatively, there are a plurality of drives, separately for the static height adjustment and dynamic reciprocating stroke.

Advantageously, the workpiece spindle is arranged in a fixed manner in the horizontal direction. The necessary positioning movements are carried about by the horizontal movement of the honing ring carrier. As a result, the construction of the machine is kept as simple as possible.

In a preferred embodiment, there is a tailstock for interacting with the workpiece spindle. Said tailstock allows additional support of the workpiece spindle and is indicated primarily when strong radial forces act on the workpiece in the context of the machining operation and/or in the case of a long workpiece length. Otherwise, the use of a tailstock is unnecessary.

Advantageously, the tailstock is mounted in a force-dependent manner, for example resiliently, and no mechanical coupling between the tailstock and workpiece spindle occurs during operation of the machine. This allows easy coupling and detaching of the connection between the tailstock and spindle, for example in the context of a workpiece and/or tool change.

Particularly preferably, the mounting is force dependent but not travel dependent. Therefore, the tailstock does not have to be coupled to the height adjustable workpiece spindle. As a result, the structure can be realized in a very simple manner.

In a preferred embodiment, the tailstock is fastened to the machine frame in a pivotable manner by way of its tip. In use, the tailstock tips over the honing spindle. The tailstock tip is mounted linearly and is pressed against the workpiece spindle with a defined force. The force can be generated pneumatically, hydraulically, electrically or by means of a spring or counterweights (lever, cable pull, etc.).

Depending on the torques that occur and the dimensioning of the workpiece spindle, the use of a tailstock may be unnecessary, with the result that the construction of the machine can be kept as simple as possible and the accessibility to the honing ring carrier and the workpiece spindle is not impaired in any way.

Further advantageous embodiments and combinations of features of the invention can be gathered from the following detailed description and the entirety of the claims.

BRIEF DESCRIPTION OF THE DRAWINGS

In the drawings used to explain the exemplary embodiment.

In principle, identical parts are provided with the same reference signs in the figures.

WAYS OF IMPLEMENTING THE INVENTION

Figure 1:
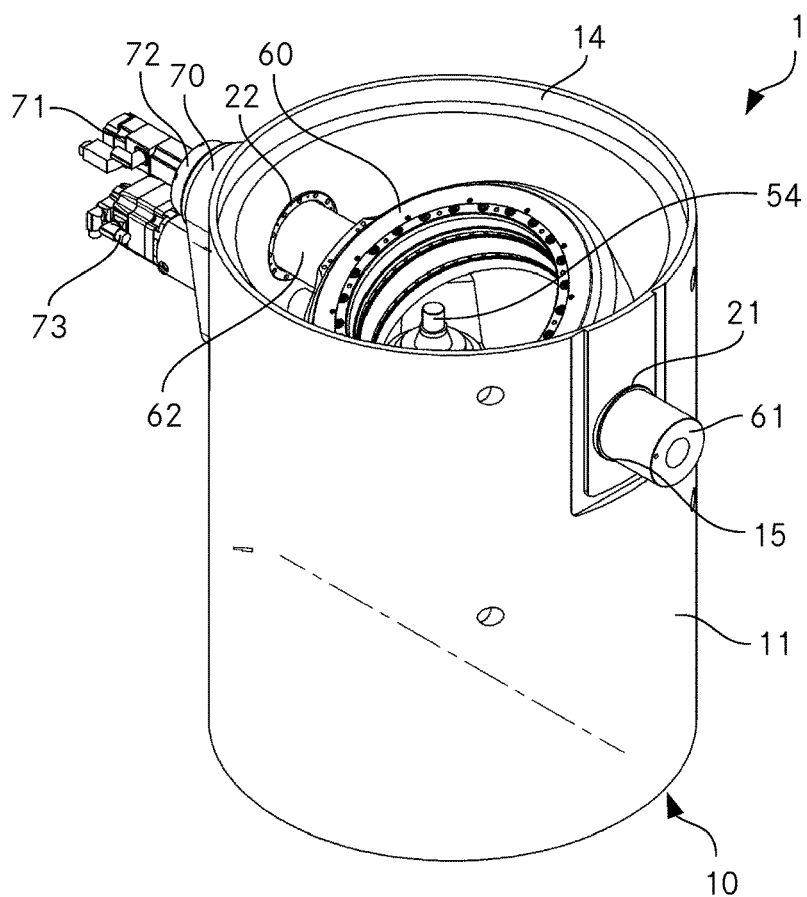
FIG. 1 shows an oblique view of one embodiment of the machine according to the invention for honing gears.
Figure 2:
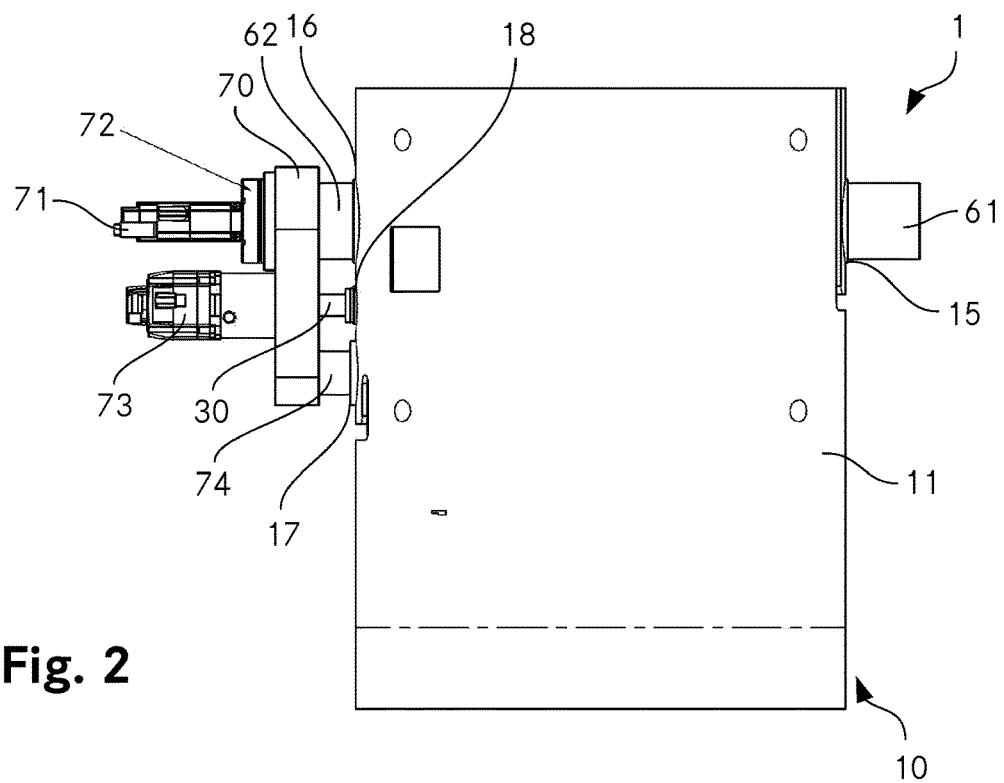
FIG. 2 shows a side view of the machine.
Figure 3:
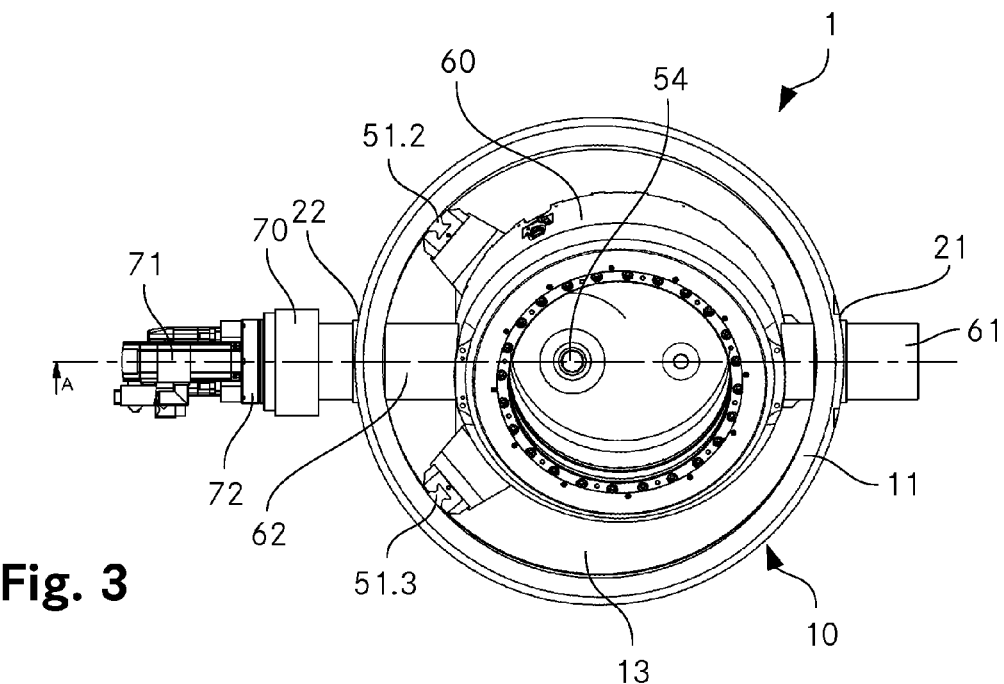
FIG. 3 shows a plan view of the machine.
Figure 4:
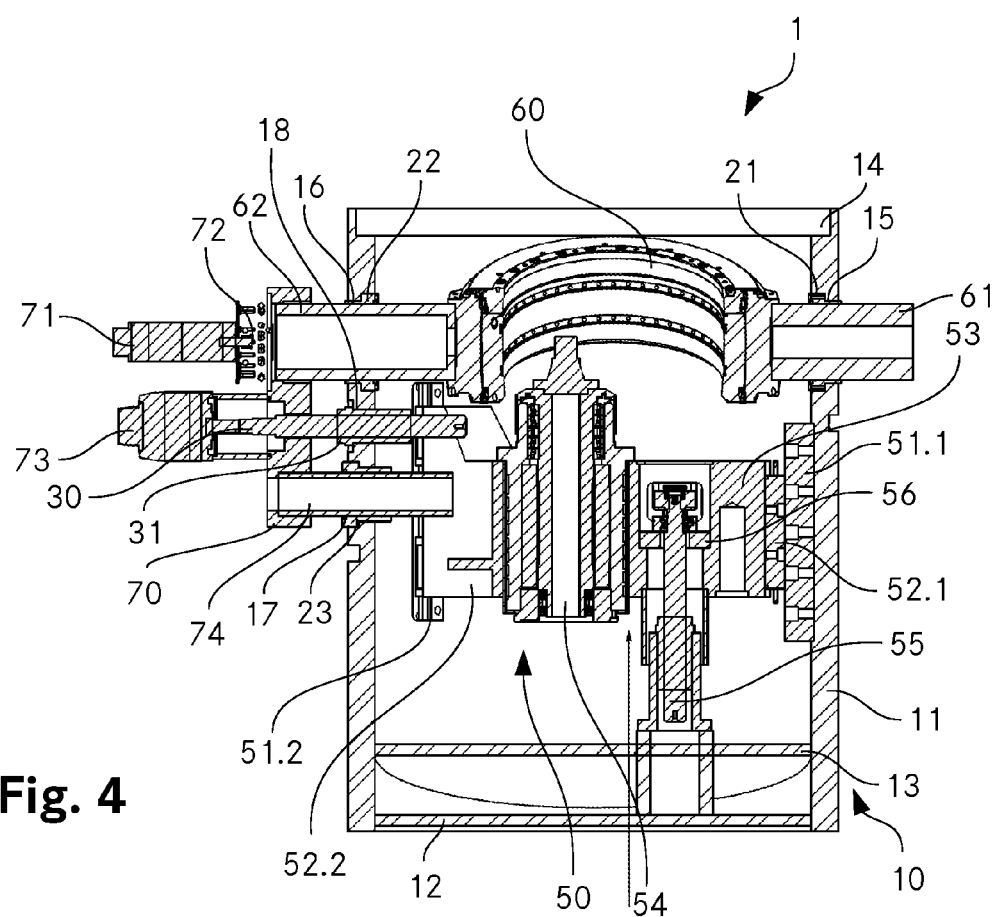
FIG. 4 shows a vertical cross section through the machine.
Figure 5A:
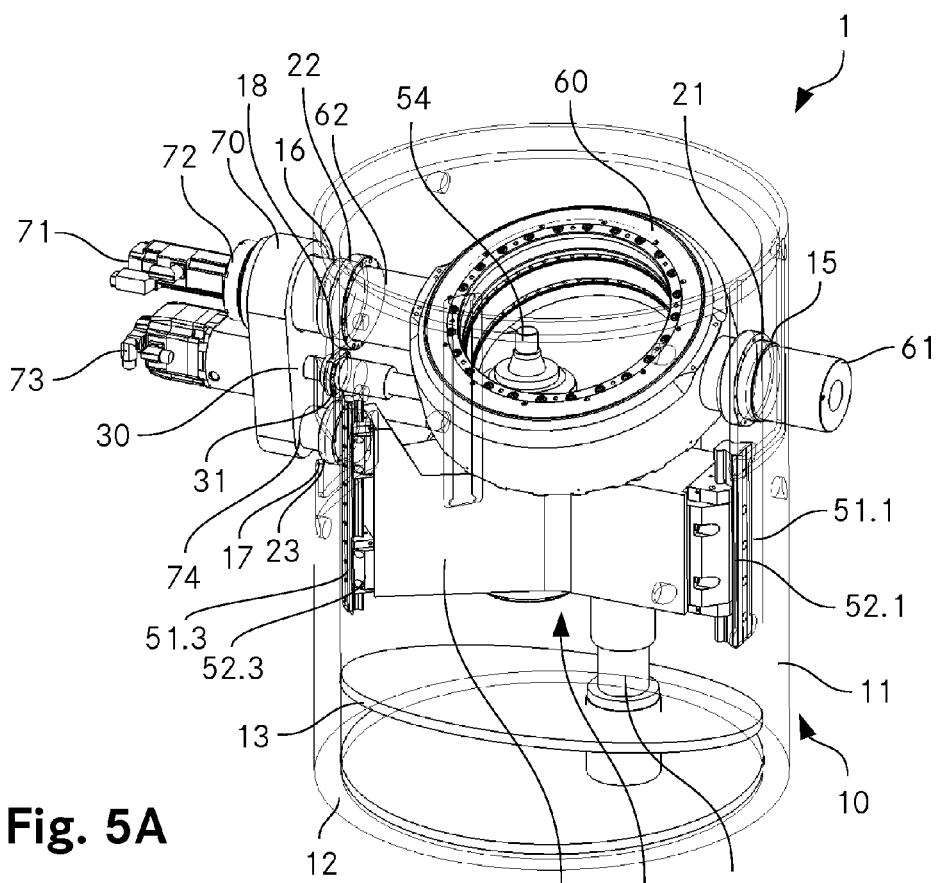
FIG. 5A, B show oblique views of the machine from different viewing angles, with a transparently illustrated machine frame.
Figure 5B:
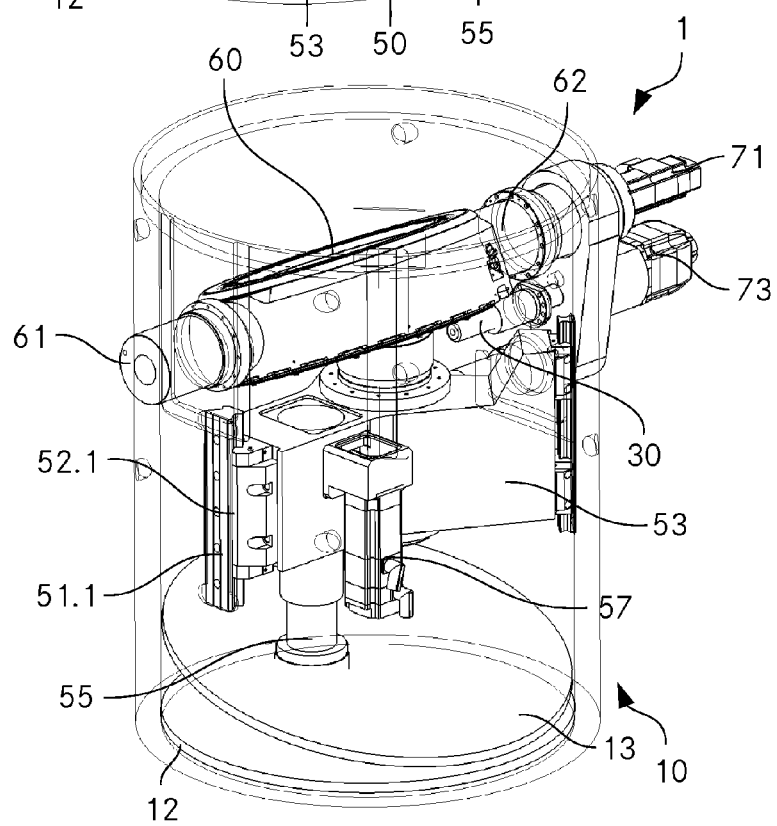

An exemplary embodiment of the machine according to the invention for honing gears is illustrated in FIGS. 1-5. FIG. 1 shows an oblique view of the machine, FIG. 2 a side view, FIG. 3 a plan view, FIG. 4 a vertical cross section through the machine and FIGS. 5A, 5B two oblique views of the machine from different viewing angles, with a transparently illustrated machine frame.

The machine 1 comprises a machine frame 10. The casing 11 thereof is formed by a circular cylindrical steel tube. The circular base 12 is formed by a correspondingly shaped steel plate fastened horizontally in the tube. A further, thinner steel plate 13 is fastened in the casing 11, above the base 12. This thinner steel plate 13 is oriented obliquely with respect to the base 12 and accordingly has an elliptical shape such that it fills the casing 11 of the machine frame 10. The thinner steel plate 13 receives lubricants and chips, after which the latter move downward on the steel plate 13 under the force of gravity and can be collected at the bottom end of the plate and optionally carried away.

At its top end, the casing 11 of the machine frame 10 has an encircling receiving groove 14 which is formed by an internal recess that opens into the end side. A flat, circular cylindrical cover can be inserted into this receiving groove 14 from above in order to close off the receiving space formed by the machine frame 10. The cover can be manufactured from a transparent material so that it remains possible to visually monitor the machining operation.

Formed in the machine frame 10 are four round openings 15, 16, 17, 18, the axes of which each extend horizontally and perpendicularly to the lateral face of the casing 11. The two openings 15, 16 are located diametrically opposite one another, and their axes coincide. They each have a step approximately halfway through the casing thickness, wherein the cross section of the openings 15, 16 widens from outside to inside at the step. Plain bushings 21, 22 are inserted into the openings 15, 16. The external contours of the plain bushings 21, 22 are adapted to the internal contours of the openings 15, 16 with the steps. The plain bushings 21, 22 and the function thereof are described in more detail below.

The opening 17 is arranged vertically beneath the opening 16. It likewise has a step approximately halfway through the casing thickness, wherein the cross section decreases from outside to inside there, however. A plain bushing 23 is likewise inserted into the opening 17. The diameter of the opening 17 and of the plain bushing 23 is smaller than that of the openings 15, 16.

The final opening 18 is located on the connecting line between the centers of the openings, 16, 17 arranged one beneath the other. Its diameter is somewhat smaller again than that of the lower opening 17. The nut 31 of a ball screw 30 is inserted into the central opening 18.

A workpiece spindle device 50 is mounted in the machine frame 10. Said workpiece spindle device 50 comprises three vertically extending guide rails 51.1, 51.2, 51.3 fastened to the inside of the casing 11 of the machine frame 10. The first guide rail 51.1 is arranged directly beneath the single round opening 15, and the two further guide rails 51.2, 51.3 are arranged symmetrically with respect to the three further opening 16, 17, 18 with regard to their angular position, the angle with the axis of the openings 15, 16, 17, 18 being in each case about 40°. A carriage 52.1, 52.2, 52.3 interacts with each of the rails 51.1 . . . 3, wherein each of the carriages 51.1 . . . 3 has two rollers units which interact with the external profiling of the rail 51.1 . . . 3 in a manner known per se.

The carriages 51.1 . . . 3 are firmly attached to a spindle carrier 53. The latter is substantially Y-shaped in plan view, wherein the three legs extend as far as the respective carriages 51.1 . . . 3. The workpiece spindle 54 is mounted in a central opening in the spindle carrier 53. Said workpiece spindle 54 is a spindle known per se with direct drive. The free end of the workpiece spindle 54 comprises coupling means for directly or indirectly fastening the workpiece.

The nut 56 of a ball screw 55 is likewise mounted in the spindle carrier 53. The ball screw extends vertically downward from the spindle carrier 53 and extends through an opening in the obliquely oriented steel plate 13, its lower end being supported on the base 12 of the machine frame 10. The ball screw 55 is driven via a toothed belt by a motor 57 which is flange-mounted on the outside of the spindle carrier 53 and is moved up and down in the vertical direction therewith.

The workpiece spindle 54 can be moved in the vertical direction with respect to the guide rails 51.1 . . . 3 by means of a linear movement of the carriages 51.1 . . . 3, such that the free end of the workpiece spindle 54 can reach any required plane within the honing ring receptacle (see below) with the coupling means. During the honing operation, the workpiece spindle 54 dynamically executes a reciprocating stroke with an amplitude of for example about 2 mm. Furthermore, its working height can be adjusted (statically) in a range of about 60 mm. Both movements are effected by the motor 57 via the ball screw 55.

The supporting device for a honing ring carrier 60 is mounted in the plain bushings 21, 22, 23 received in the openings 15, 16, 17 in the machine frame 10. The honing ring carrier is formed toroidally in a manner known per se and comprises a honing ring receptacle which can be set into rotational movement about the torus axis via a direct drive. The supporting device comprises two steel tubes 61, 62 which are fastened to the external casing of the honing ring carrier 60 diametrically opposite one another. The steel tubes 61, 62 extend to the outside on both sides from the honing ring carrier 60 through the corresponding openings 15, 16 in the machine frame 10. Their external dimensions are selected such that they can interact with the corresponding plain bushings 21, 22 with a precise fit. While the steel tube 61 that interacts with the individual opening 15 is free at its external end, the external end of the diametrically opposite steel tube 62 is mounted on a drive carrier 70. Mounting is executed such that the steel tube 62 can be rotated about its longitudinal axis with respect to the drive carrier 70, but the steel tube 62 is fixed in the axial direction with respect to the drive carrier 70.

The output shaft of a servomotor 71 fastened to the radially outer side of the drive carrier 70 and supported with respect thereto is aligned with the longitudinal axis of the steel tube 62. The output shaft acts on the steel tube 62 via a robot transmission 72 and can rotate said steel tube relative to the drive carrier 70. Accordingly, a changed angular position of the honing ring carrier 60 about the common longitudinal axes of the two steel tubes 61, 62 is brought about.

A further servomotor 73 is likewise fastened to the outer side of the drive carrier 70 and supported with respect thereto. The further servomotor 73 interacts via a clutch with the ball screw 30, which again interacts with the abovementioned nut 31 inserted into the central opening 18. By actuation of the servomotor 73, the drive carrier 70 can be displaced radially inward or outward in the horizontal direction with respect to the machine frame 10. The position of the honing ring carrier 60 changes accordingly.

Finally, a further steel tube 74 is fastened fixedly to the drive carrier 70. It extends horizontally and radially inward into the interior of the machine frame 10 through the lower opening 17. This steel tube 74 serves as an antirotation device and support, in particular for the torque exerted on the steel tube 62 by means of the servomotor 71.

The invention is not limited to the illustrated exemplary embodiment. Thus, in particular the geometry of the individual components, for example of the machine frame, of the drive carrier, of the honing ring receptacle or of the spindle carrier can be chosen to be different. The drives can be configured differently or arranged differently.

Rather than via rails fastened to the machine frame, the spindle carrier can for example also be vertically displaceable with respect to guides which are arranged on an inwardly extending supporting structure fastened to the machine frame. The guides can be realized for example by guide tubes and plain bushings. The drive for the vertical movement of the spindle can likewise be arranged on the supporting structure, i.e. in a stationary manner in contrast to the exemplary embodiment illustrated above.

To summarize, a machine for honing gears, which has a simple and space-saving structure, is created by the invention.

The invention claimed is:
1. A machine for honing gears, comprising
 a) a workpiece spindle, the spindle axis of which is oriented vertically, wherein a workpiece to be machined is attachable in the region of a free end of the workpiece spindle;
 b) a honing ring carrier in which a honing ring for machining the workpiece attached to the workpiece spindle is clampable and is drivable in rotation about its central axis;
 c) a machine frame on which the workpiece spindle and the honing ring carrier are mounted; wherein
 d) the machine frame surrounds the honing ring carrier and
 e) the honing ring carrier is mounted at two bearing points on the machine frame, so as to be movable linearly along a horizontal axis which extends through the bearing points and so as to be movable in rotation about this axis, said bearing points being substantially diametrically opposite one another with regard to the honing ring carrier.

2. The machine as claimed in claim 1, wherein the free end of the workpiece spindle is directed upward and in that the workpiece spindle is surrounded by the machine frame.

3. The machine as claimed in claim 2, wherein that a drive for the workpiece spindle is arranged beneath the free end of the workpiece spindle.

4. The machine as claimed in claim 1, wherein the machine frame forms a substantially closed enclosure which encloses a working space.

5. The machine as claimed in claim 3, wherein the machine frame is configured such that the working space is closable at the top by way of a flat cover for operation of the machine.

6. The machine as claimed in claim 1, wherein the machine frame is configured in a straight cylindrical manner.

7. The machine as claimed in claim 1, wherein the bearing points comprise plain bearings or hydrostatic bearings.

8. The machine as claimed in claim 1, wherein a carrier on which a first drive for moving the honing ring carrier linearly along the horizontal axis extending through the bearing points and a second drive for moving the honing ring carrier in rotation about this axis are arranged, wherein the carrier is arranged outside the machine frame and is displaceable along the horizontal axis together with the honing ring carrier.

9. The machine as claimed in claim 8, wherein the first drive is coupled to a ball screw, wherein the ball screw is supported on the machine frame.

10. The machine as claimed in claim 8, wherein that a guide element is fixedly arranged on the carrier, wherein the guide element interacts with a further bearing point on the machine frame.

11. The machine as claimed in claim 1, wherein the machine frame is produced substantially from cast stone.

12. The machine as claimed in claim 1, wherein the machine frame is produced substantially from steel.

13. The machine as claimed in claim 1, wherein the workpiece spindle can execute a vertical stroke.

14. The machine as claimed in claim 1, wherein the workpiece spindle is adjustable in the vertical direction and is fixable in a desired vertical position.

15. The machine as claimed in claim 1, wherein a tailstock for interacting with the workpiece spindle.

16. The machine as claimed in claim 15, wherein the tailstock is mounted in a force-dependent manner and no mechanical coupling between the tailstock and workpiece spindle occurs during operation of the machine.

17. The machine as claimed in claim 6, wherein the machine frame is configured in a circular cylindrical manner.

18. A machine for honing gears, comprising:
  a) a workpiece spindle, the spindle axis of which is oriented vertically, wherein a workpiece to be machined is attachable in the region of a free end of the workpiece spindle;
  b) honing ring carrier in which a honing ring for machining the workpiece attached to the workpiece spindle is clampable and is drivable in rotation about its central axis;
  c) a machine frame on which the workpiece spindle and the honing ring carrier are mounted; wherein
  d) the machine frame surrounds the honing ring carrier,
  e) the honing ring carrier is mounted at two bearing points on the machine frame, said bearing points being substantially diametrically opposite one another with regard to the honing ring carrier, so as to be movable linearly along a horizontal axis which extends through the bearing points and so as to be movable in rotation about this axis
  f) and wherein the two bearing points comprise bearings with two degrees of freedom, a linear degree of freedom and a rotational degree of freedom.

* * * * *